(12) United States Patent
Pacella et al.

(10) Patent No.: US 9,077,755 B2
(45) Date of Patent: Jul. 7, 2015

(54) NETWORK-BASED GEO-LOCATION IDENTIFICATION OF AN END-USER DEVICE

(75) Inventors: Dante J. Pacella, Charles Town, WV (US); Norman Richard Solis, Fairfax, VA (US); Harold Jason Schiller, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 840 days.

(21) Appl. No.: 12/481,951

(22) Filed: Jun. 10, 2009

(65) Prior Publication Data

US 2010/0318628 A1 Dec. 16, 2010

(51) Int. Cl.
*G06Q 30/00* (2012.01)
*H04L 29/06* (2006.01)
*H04L 29/08* (2006.01)
*H04W 4/02* (2009.01)

(52) U.S. Cl.
CPC .............. *H04L 67/20* (2013.01); *H04L 63/102* (2013.01); *H04L 67/303* (2013.01); *H04L 63/30* (2013.01); *H04W 4/02* (2013.01)

(58) Field of Classification Search
USPC ............................................ 709/217; 705/14
See application file for complete search history.

(56) References Cited

U.S. PATENT DOCUMENTS

| 6,594,699 | B1 | 7/2003 | Sahai et al. | |
|---|---|---|---|---|
| 2002/0083148 | A1 | 6/2002 | Shaw et al. | |
| 2005/0195949 | A1* | 9/2005 | Frattura | 379/88.17 |
| 2007/0079331 | A1* | 4/2007 | Datta et al. | 725/42 |
| 2008/0201225 | A1* | 8/2008 | Maharajh et al. | 705/14 |
| 2008/0215720 | A1* | 9/2008 | Westin | 709/224 |
| 2009/0006211 | A1* | 1/2009 | Perry et al. | 705/14 |
| 2009/0210549 | A1 | 8/2009 | Hudson et al. | |
| 2010/0017815 | A1 | 1/2010 | Mas Ivars et al. | |
| 2010/0106611 | A1* | 4/2010 | Paulsen et al. | 705/26 |
| 2010/0220700 | A1* | 9/2010 | Hodroj et al. | 370/338 |
| 2011/0105144 | A1* | 5/2011 | Siomina et al. | 455/456.1 |

* cited by examiner

*Primary Examiner* — Glenford Madamba

(57) ABSTRACT

A device receives a connection from a user device, and provides, to a database, connection information associated with the user device. The device receives, from the database, user device information based on the connection information, where the user device information includes a location associated with the user device. The device also receives a trigger instructing the device to provide the user device information to a content provider device, and provides the user device information to the content provider device when the trigger is received.

25 Claims, 14 Drawing Sheets

| Registration Information | Net./UD Attach. Pt. | UD Type | UD Speed | UD Zip Code | UD Location | Provider Load | Other Info. |
|---|---|---|---|---|---|---|---|
| User1 Reg. Info. | Attachment Point1 | Cell Phone | Speed1 | 99999 | NY, NY | Bandwidth1 | *** |
| User2 Reg. Info. | Attachment Point2 | STB | Speed2 | 88888 | Phila., PA | Bandwidth2 | *** |
| User3 Reg. Info. | Attachment Point3 | Laptop | Speed3 | 77777 | Wilm., DE | Bandwidth3 | *** |

610 620 630 640 650 660 670 680

690 { (rows above)

910

920 ⇢

940 →

NETWORK-BASED GEO-LOCATION IDENTIFICATION OF AN END-USER DEVICE

BACKGROUND

In networks (e.g., Internet protocol (IP)-based networks, telecommunications networks, etc.), a significant amount of effort is expended trying to identify a physical location (e.g., a geographical location or "geo-location") of an end user device (e.g., a mobile telephone, a set-top box (STB), a laptop computer, etc.) connected to the network. Some rudimentary services can identify the physical locations of end user devices. For example, a weather channel may target advertisements based on a perceived location of a user (e.g., of an end user device, such as an STB).

BRIEF DESCRIPTION OF THE DRAWINGS

FIG. 6 illustrates a diagram of an exemplary portion of a database depicted in FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that retrieve information (e.g., customer information, device configuration information, location information, etc.) about an end user device (referred to herein as a "user device") attached to a provider device via a network. The systems and/or methods may provide specific or general information about the customer and/or the user device based on the retrieved information. Information may be retrieved and/or provided via a postmark protocol. The postmark protocol may permit network devices associated with the network to provide information (e.g., metadata) regarding their locations, which may permit end-to-end geo-location path discovery. Alternatively, the network devices may hide their geographic topologies from external entities (e.g., third party content providers not associated with the network). The postmark protocol may be used to restrict or allow network flows, identify locations of user devices or network devices, allow localized differentiation for transactions, etc.

As used herein, the terms "customer" and/or "user" may be used interchangeably. Also, the terms "customer" and/or "user" are intended to be broadly interpreted to include a user device or a user of a user device.

As used herein, the term "postmark protocol" is intended to be broadly interpreted to include a network transmission protocol that enables a physical (e.g., geographical) location of a user device (e.g., connected to the network) to be ascertained.

Figure 1:
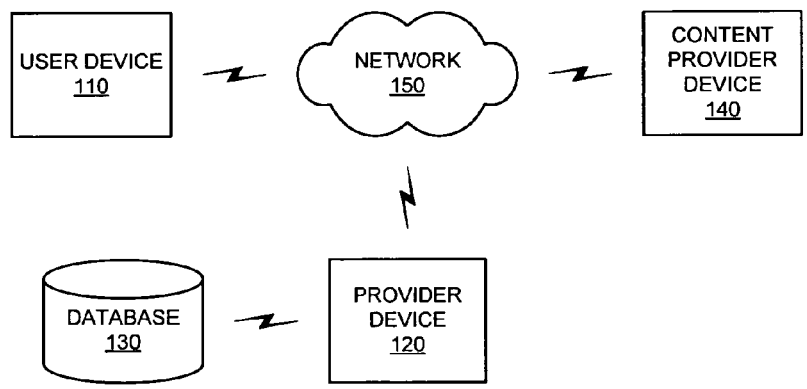
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a user device 110, a provider device 120, a database 130, and a content provider device 140 interconnected by a network 150. Components of network 100 (e.g., one or more of user device 110, provider device 120, database 130, content provider device 140, and network 150) may interconnect via wired and/or wireless connections. A single user device 110, provider device 120, database 130, content provider device 140, and network 150 have been illustrated in FIG. 1 for simplicity. In practice, there may be more user devices 110, provider devices 120, databases 130, content provider devices 140, and/or networks 150. Also, in some instances, a component in network 100 may perform one or more functions described as being performed by another component or group of components in network 100.

User device 110 may include a radiotelephone, a personal communications system (PCS) terminal (e.g., that may combine a cellular radiotelephone with data processing and data communications capabilities), a STB, a PDA (e.g., that can include a radiotelephone, a pager, Internet/intranet access, etc.), a laptop computer, a personal computer, or other types of computation or communication devices, threads or processes running on these devices, and/or objects executable by these devices. In one implementation, user device 110 may include any device (e.g., an Internet Protocol (IP)-based device) that enables a user to access the Internet and/or communicate with provider device 120 and/or content provider device 140 via network 150.

Provider device 120 may include one or more server entities, or other types of computation or communication devices, that gather, process, search, and/or provide information in a manner described herein. Provider device 120 may be associated with a provider that owns and/or manages provider device 120, database 130, and/or network 150 (or a portion of network 150). In one implementation, provider device 120 may receive a connection by user device 110, and may provide connection information (e.g., network attachment point data, user device 110 attachment point data, etc.) associated with user device 110 to database 130. Provider device 120 may receive, from database 130, information (e.g., geo-location information, etc.) associated with user device 110 based on the connection information, and may receive a trigger instructing provider device 120 to provide the user device information to content provider device 140. When the trigger is received, provider device 120 may verify a content provider associated with content provider device 140, and may provide the user device information to content provider device 140 when the content provider is verified.

Database 130 may include one or more storage devices that may store information received by and/or provided to provider device 120. In one implementation, database 130 may store information described below in connection with, for example, FIG. 6. For example, database 130 may store registration information (e.g., user name, address, etc.) associated with user device 110, type information (e.g., make, model, etc.) associated with user device 110, speed information (e.g., in gigabits per second) associated with user device 110, load information (e.g., bandwidth) associated with provider device 120, etc. Although FIG. 1 shows database 130 as separate from provider device 120, in other implementations, database 130 may be incorporated in provider device 120.

Content provider device 140 may include one or more server entities, or other types of computation or communication devices, that gather, process, search, and/or provide information in a manner described herein. Content provider device 140 may be associated with a third party content provider that is not associated with (e.g., owns and/or manages) provider device 120, database 130, and/or network 150. In one implementation, content provider device 140 may receive, from provider device 120, information (e.g., geo-location information, etc.) associated with user device 110. Based on the information associated with user device 110, content provider device 140 may provide advertisements and/or content localized for user device 110, may calculate demographic statistics, may redirect content delivery to a specific local content, may restrict financial transactions to a specific location, may prevent content delivery to illegal locations, and/or may provide, to law enforcement or emergency services agencies (or entities), a location of user device 110.

Network 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a session initiation protocol (SIP)-based network, or a combination of networks. In one implementation, network 150 may include one or more network devices (e.g., routers, gateways, switches, network interface cards (NICs), hubs, a bridges, etc.) that may route information (e.g., datagrams) to and/or from user device 110, provider device 120, database 130, and/or content provider device 140. A "datagram(s)" may include any type or form of data, such as packet or non-packet data.

Figure 2:
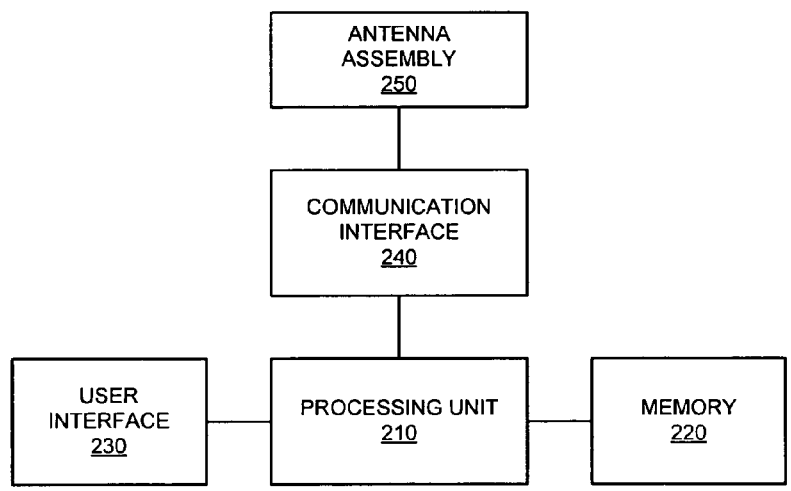
FIG. 2 illustrates a diagram of exemplary components of a user device depicted in FIG. 1.

FIG. 2 illustrates a diagram of exemplary components of a device 200 that may correspond to user device 110. As illustrated, device 200 may include a processing unit 210, memory 220, a user interface 230, a communication interface 240, and/or an antenna assembly 250.

Processing unit 210 may include one or more microprocessors, application-specific integrated circuits (ASICs), field-programmable gate arrays (FPGAs), or the like. Processing unit 210 may control operation of device 200 and its components. In one implementation, processing unit 210 may control operation of components of device 200 in a manner described herein.

Memory 220 may include a random access memory (RAM), a read-only memory (ROM), and/or another type of memory to store data and instructions that may be used by processing unit 210.

User interface 230 may include mechanisms for inputting information to device 200 and/or for outputting information from device 200. Examples of input and output mechanisms might include buttons (e.g., control buttons, keys of a keypad, a joystick, etc.) or a touch screen interface to permit data and control commands to be input into device 200; a speaker to receive electrical signals and output audio signals; a microphone to receive audio signals and output electrical signals; a display to output visual information (e.g., text input into device 200); a vibrator to cause device 200 to vibrate; etc.

Communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air, and receive RF signals over the air and provide them to communication interface 240. In one implementation, for example, communication interface 240 may communicate with a network (e.g., network 150) and/or devices connected to a network.

As will be described in detail below, device 200 may perform certain operations described herein in response to processing unit 210 executing software instructions of an application contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
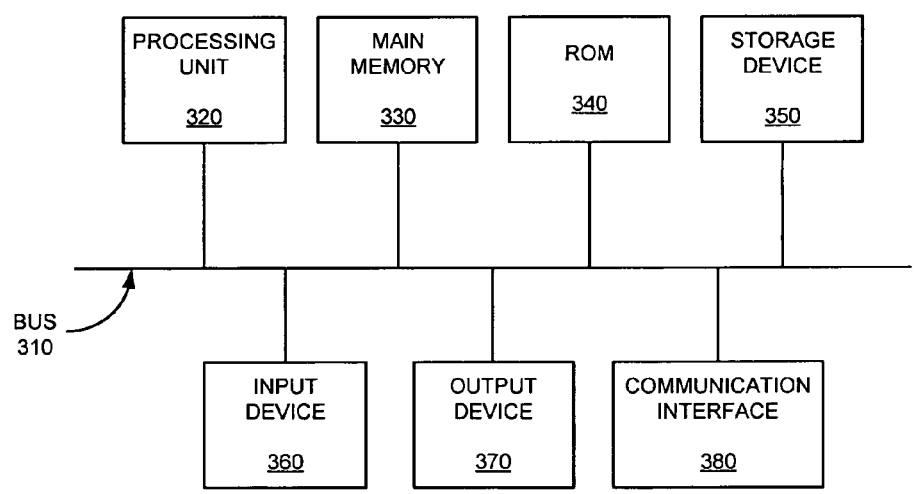
FIG. 3 depicts a diagram of exemplary components of the user device, a provider device, and/or a content provider device illustrated in FIG. 1.

FIG. 3 depicts a diagram of exemplary components of a device 300 that may correspond to user device 110 (e.g., if user device is a laptop computer or a personal computer), provider device 120, and/or content provider device 140. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processors that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 150.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
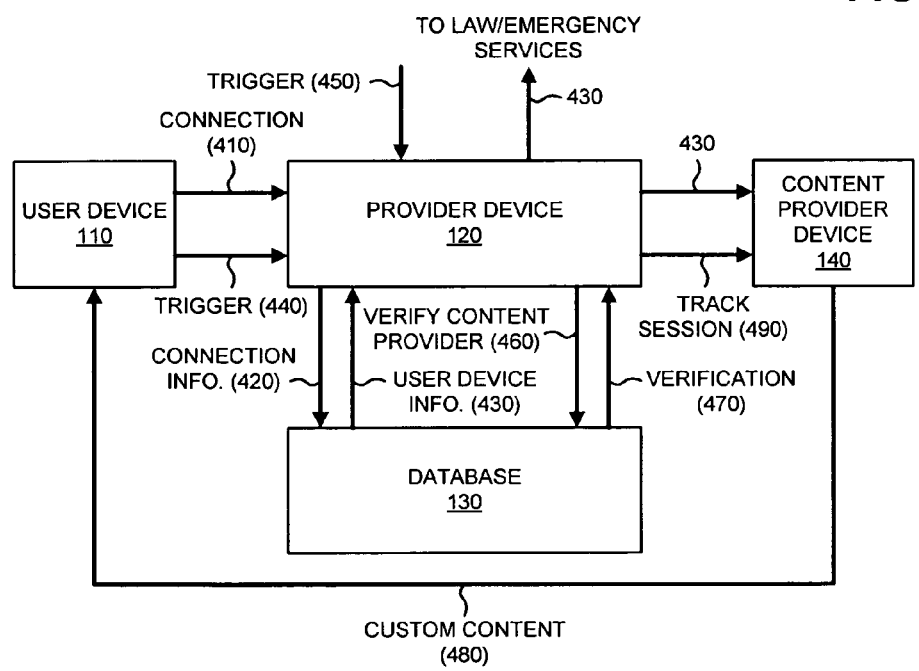
FIG. 4 illustrates a diagram of exemplary interactions among components of an exemplary portion of the network depicted in FIG. 1.

FIG. 4 illustrates a diagram of exemplary interactions among components of an exemplary portion 400 of network 100. As illustrated, exemplary network portion 400 may include user device 110, provider device 120, database 130, and content provider device 140. User device 110, provider device 120, database 130, and content provider device 140 may include the features described above in connection with, for example, FIG. 1.

As further shown in FIG. 4, user device 110 may connect to provider device 120, as shown by reference number 410. For example, if user device 110 is accessing a web site generated by provider device 120, user device 110 may connect to provider device 120 via a uniform resource locator (URL) associated with the web site. Provider device 120 may receive connection 410, and may provide connection information 420 to database 130. Connection 410 between user device 110 and provider device 120 may include a dedicated single logical or physical port connection per each customer (e.g., each user device 110), a shared access connection (e.g., a broadcast domain for a set of customers), a mobile or Wi-Fi connection, etc. Each of these connection types may have a different level of accuracy for a specific location, but other mechanisms (e.g., triangulation mechanisms, heartbeat/network time protocol (NTP)/round trip time (RTT) mechanisms, etc.) for increasing accuracy for shared and mobile customers may also be implemented.

Connection information 420 may include information associated with user device's 110 connection 410 with provider device 120. For example, connection information 420 may include network attachment point information or metadata (e.g., information about network devices of network 150 used to connect user device 110 to provider device 120) that may be initialized on deployment of provider device 120, user device 110 attachment point information or metadata that may be initialized on deployment of a service (e.g., a new service, a changed service, etc.) provided by provider device 120, etc. In one implementation, each device of network 100 may embed a location and/or other location-relevant metadata in selective datagrams. For example, connection 410 may include datagrams that embed location information (e.g., a geographical location, a zip code, etc.) associated with user device 110.

In response to connection 410 and/or connection information 420, provider device 120 may retrieve user device information 430 from database 130 (e.g., via a query or some other data retrieval mechanism). User device information 430 may include information (e.g., metadata) about user device 110, a user of user device 110, a connection point of user device 110 (e.g., to network 150), etc. For example, user device information 430 may include attachment point information (e.g., a connection point of user device 110 to network 150); a geographical location of user device 110; a zip code associated with user device 110; a speed (e.g., in gigabits per second) of user device 110; a type (e.g., a brand, a manufacturer, etc.) of user device 110; a timestamp associated with user device 110 (e.g., when user device 110 connects to provider device 120); congestion information associated with connection 410; a load (e.g., a bandwidth) associated with provider device 120; registration information (e.g., a user name, a user address, a user telephone number, etc.) associated with a user; other database 130 information (e.g., information about third party content providers, such as a content provider associated with content provider device 140); other measurements and/or characteristics associated with network 150; etc.

As further shown in FIG. 4, user device 110 may provide a trigger 440 to provider device 120 and/or another trigger 450 may be provided to provider device 120 (e.g., by content provider device 140 or other sources). Triggers 440/450 may be received by provider device 120, and may direct provider device 120 (e.g., via the postmark protocol associated with network 100) to provide user device information 430 to third parties, such as a third party content provider associated with content provider device 140. Triggers 440/450 may include network event-based triggers (e.g., a trigger for every packet, a trigger for every Transmission Control Protocol (TCP) open, a trigger for every TCP close, a port-based trigger, etc.), customer-specified triggers (e.g., a customer may want bandwidth specified for remote devices, such as content provider device 140), destination-specified triggers (e.g., content providers may wish to provide real-time localized content to user device 110), provider-specified triggers (e.g., provider device 120 may provide enhanced 911 (or "e911") emergency services), etc.

The postmark protocol (e.g., and provider device 120) may not convey user device information 430 to third parties until triggers 440/450 are received. If triggers 440/450 are not received by provider device 120, the transmission of information may occur only between a user (e.g., via user device 110) and a provider (e.g., via provider device 120). If triggers 440 or 450 are received by provider device 120, user device information 430 may be conveyed, by provider device 120, to authorized content providers (e.g., content provider device 140). Thus, the postmark protocol (e.g., and provider device 120) may not create any specialized privacy concerns for customers. Prior to providing user device information 430 to content provider device 140, provider device 120 may verify the content provider associated with content provider device 140, as indicated by reference number 460. For example, provider device 120 may search database 130 to determine whether the content provider is a subscriber to user device information 430 (e.g., a location service). Other security mechanisms may be used to verify the content provider, such a public key encryption mechanisms, private key encryption mechanisms, etc. If the content provider is verified, as indicated by reference number 470, provider device 120 may provide user device information 430 to content provider device 140.

In one exemplary implementation, the postmark protocol may include a requirement to log in to provider device 120 (e.g., by the content provider) to verify and authenticate the content provider and to prevent anti-spoofing. The postmark protocol may be extended to replace or enhance other location identification services, such as the Internet control message protocol (ICMP) (e.g., the echo or ping protocol) and traceroute functionality.

As further shown in FIG. 4, if content provider device 140 receives user device information 430, content provider device 140 may provide custom content 480 to user device 110. Custom content 480 may include a variety of information customized based on user device information 430 (e.g., based on a location associated with user device 110). For example, custom content 480 may include advertisements or other content that is localized based on the location associated with user device 110; marketing information targeted to the location associated with user device 110 (e.g., content provider device 140 may determine marketing information based on demographic statistics calculated based on the locations of several user devices 110); content redirected to a local content provider based on the location associated with user device 110 (e.g., a network news request may be redirected to a local affiliate of the network news); restriction of financial transactions to the location associated with user device 110; prevention of illegal content delivery to the location associated with user device 110; etc. Further details of custom content 480 are provided below in connection with, for example, FIG. 8.

Provider device 120 may also provide user device information 430 to law enforcement services and/or emergency services. For example, law enforcement services and/or emergency services (e.g., e911 services) may utilize user device information 430 to make a quicker determination of a location of a user associated with user device 110. This may enable law enforcement services and/or emergency services to respond to emergencies (e.g., associated with the user) in a quicker manner. As further shown in FIG. 4, provider device 120 (e.g., via the postmark protocol) may track an establishment of a session between content provider device 140 and user device 110 (e.g., to provide custom content 480), as indicated by reference number 490. The tracking of the session between content provider device 140 and user device 110 may provide increased security for both the user of user device 110 and the content provider.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
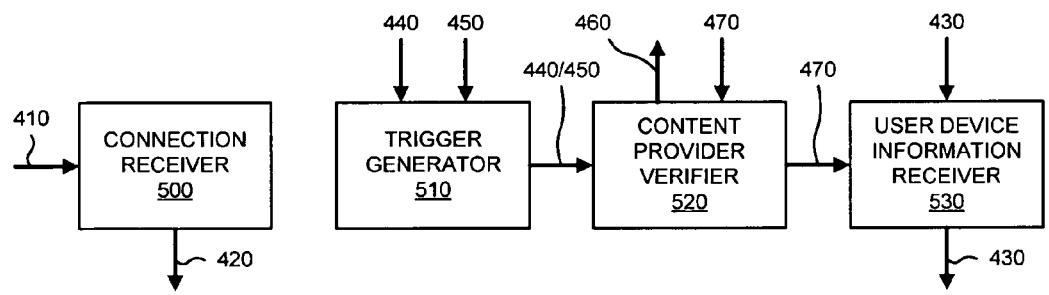
FIG. 5 depicts a diagram of exemplary functional components of the provider device illustrated in FIG. 1.

FIG. 5 depicts a diagram of exemplary functional components of provider device 120. In one implementation, the functions described in connection with FIG. 5 may be performed by processing unit 320 (FIG. 3). As shown in FIG. 5, provider device 120 may include a connection receiver 500, a trigger generator 510, a content provider verifier 520, and a user device information receiver 530.

Connection receiver 500 may include hardware or a combination of hardware and software that may receive connection 410 by user device 110 (e.g., with provide device 120), and may provide connection information 420 to database 130, as described above in connection with FIG. 4. Provider device 120 (e.g., user device information receiver 530) may receive, from database 130, user device information 430 in response to providing connection information 420 to database 130. In one implementation, connection information 420 may be used to perform a search (or query) of database 130 for user device information 430.

Trigger generator 510 may include hardware or a combination of hardware and software that may receive trigger 440 from user device 110, and may receive trigger 450 from content provider device 140 or other sources. Triggers 440/450 may instruct provider device 120 (e.g., trigger generator 510) to provide triggers 440/450 to content provider verifier 520 so that a content provider may be verified before receiving user device information 430.

Content provider verifier 520 may include hardware or a combination of hardware and software that may receive triggers 440/450 from trigger generator 510. Triggers 440/450 may instruct content provider verifier 520 to verify a content provider (e.g., as indicated by reference number 460) associated with content provider device 140. Content provider verifier 520 may perform a search (or query) of database 130 to determine whether the content provider is authorized to receive user device information 430. If the content provider is verified, content provider verifier 520 may receive verification 470 from database 130 and may provide verification 470 to user device information receiver 530.

User device information receiver 530 may include hardware or a combination of hardware and software that may receive verification 470 from content provider verifier 520. Verification 470 may indicate, to user device information receiver 530, that it is acceptable to provide user device information 430 to content provider device 140, and user device information receiver 530 may provide user device information 430 to content provider device 140.

Although FIG. 5 shows exemplary functional components of provider device 120, in other implementations, provider device 120 may contain fewer, different, differently arranged, or additional functional components than depicted in FIG. 5. In still other implementations, one or more functional components of provider device 120 may perform one or more other tasks described as being performed by one or more other functional components of provider device 120.

FIG. 6 illustrates a diagram of an exemplary portion 600 of database 130. As shown, database portion 600 may include a registration information field 610, a network/user device (UD) attachment point field 620, a user device type field 630, a user device speed field 640, a user device zip code field 650, an user device location field 660, an provider load field 670, an other information field 680, and/or a variety of entries 690 associated with fields 610-680.

Registration information field 610 may include registration information (e.g., a user name, a user address, a user telephone number, a password associated with a user, etc.) associated with users of user devices (e.g., user device 110) connected to network 150. For example, as shown in FIG. 6, registration information field 610 may include registration information associated with a first user (e.g., "User1"), a second user (e.g., "User2"), and a third user (e.g., "User3").

Network/UD attachment point field 620 may include information associated with a network attachment point and/or information associated with a user device attachment point. For example, network/UD attachment point field 620 may include an identifier for a network device (e.g., of network 150) connected to user device 110, an identifier for a network device connected to provider device 120, etc. As shown in FIG. 6, network/UD attachment point field 620 may include information associated with a first attachment point (e.g., "Attachment Point1"), a second attachment point (e.g., "Attachment Point2"), and a third attachment point (e.g., "Attachment Point3").

User device type field 630 may include information associated with types (e.g., a personal computer) of user devices 110 connected to network 150. For example, as shown in FIG. 6, user device type field 630 may include information identifying a user device 110 as a cell phone, a STB, a laptop computer, etc.

User device speed field 640 may include information associated with bandwidth or speeds (e.g., in gigabits per second) of user devices 110 connected to network 150. For example, as shown in FIG. 6, user device speed field 640 may include information associated with a first speed (e.g., "Speed1"), a second speed (e.g., "Speed2"), and a third speed (e.g., "Speed3").

User device zip code field 650 may include zip code information (e.g., postal zip codes) of user devices 110 connected to network 150. For example, as shown in FIG. 6, user device zip code field 650 may indicate that the cell phone (e.g., provided in user device type field 630) is located at zip code "99999," that the STB (e.g., provided in user device type field 630) is located at zip code "88888," and that the laptop computer (e.g., provided in user device type field 630) is located at zip code "77777."

User device location field 660 may include geographical location information (e.g., city, county, state, etc.) of user devices 110 connected to network 150. For example, as shown in FIG. 6, user device location field 660 may indicate that the cell phone (e.g., provided in user device type field 630) is located in "New York, N.Y.," that the STB (e.g., provided in user device type field 630) is located in "Philadelphia, Pa.," and that the laptop computer (e.g., provided in user device type field 630) is located in "Wilmington, Del."

Provider load field 670 may include information associated with a load (e.g., an amount of bandwidth currently in use between each device in network 100) capable of being handled by provider device 120 for the user device (e.g., provided in user device type field 630). A provider (e.g., provider device 120) may provide information associated with an amount of load provisioned for a customer, a current amount of load being used by a customer, and/or a remainder amount of load available. A load may be expressed as a percentage of a total provisioned load, a load indicated between each device in network 100, etc. For example, as shown in FIG. 6, provider load field 670 may include information associated with a first bandwidth (e.g., "Bandwidth1"), a second bandwidth (e.g., "Bandwidth2"), and a third bandwidth (e.g., "Bandwidth3").

Other information field 680 may include information associated with other measurements and/or characteristics of network 150.

Although FIG. 6 shows exemplary information that may be provided in database portion 600, in other implementations, database portion 600 may contain less, different, differently arranged, or additional information than depicted in FIG. 6.

Figure 7:
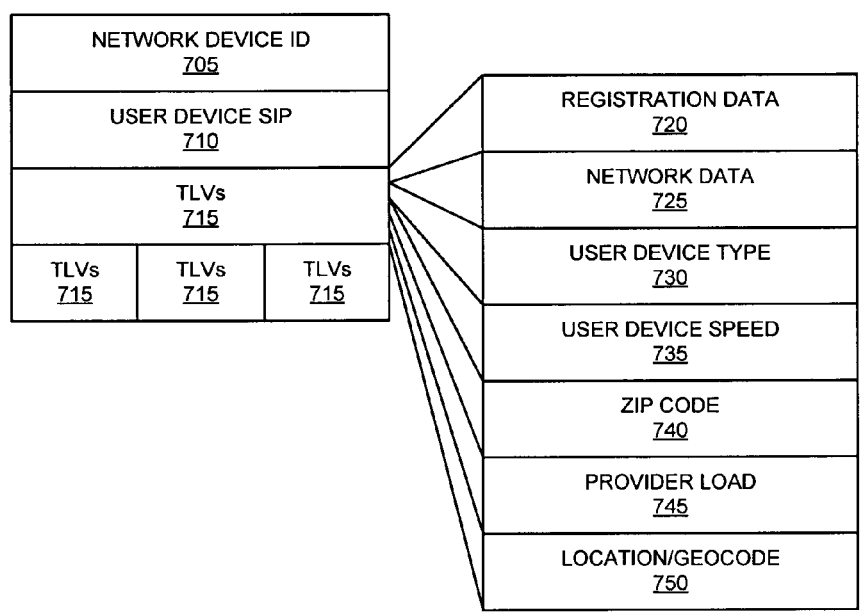
FIG. 7 depicts a diagram of exemplary elements of a datagram capable of being utilized in the network illustrated in FIG. 1.

FIG. 7 depicts a diagram of exemplary elements of a datagram 700 capable of being utilized in network 100. In one implementation, datagram 700 may be generated, transmitted, and/or received by one or more of user device 110, provider device 120, database 130, content provider device 140, and/or network devices associated with network 150. The postmark protocol associated with network 100 may transmit one or more datagrams 700 to establish communications between different devices of network 100. As shown in FIG. 7, datagram 700 may include a network device identification (ID) element 705, a user device SIP element 710, and multiple type-length-value (TLV) structure elements 715.

Network device ID element 705 may include information identifying a device (e.g., provider device 120) associated with network 150. For example, network device ID element 705 may include an address (e.g., an IP address) or other location-relevant information of a device associated with network 150.

User device SIP element 710 may include information identifying user device 110. For example, user device SIP element 710 may include an address (e.g., an IP address) or other location-relevant information associated with user device 110.

Each of TLV elements 715 may include type and length fields that are fixed in size (e.g., one to four bytes) and a value field that is of variable size. The type field may include a numeric code that indicates a kind of field that this portion of TLV element 715 represents. The length field may include a size of the value field (e.g., in bytes). The value field may include a variable-sized set of bytes that contains data for this portion of TLV element 715. As further shown in FIG. 7, each of TLV elements 715 may include one or more of a registration data element 720, a network data element 725, a user device type element 730, a user device speed element 735, a zip code element 740, a provider load element 745, and a location/geocode element 750.

Registration data element 720 may include registration information (e.g., a user name, a user address, a user telephone number, a password associated with a user, etc.) associated with users of user devices (e.g., user device 110) connected to network 150. Network data element 725 may include information associated with a network attachment point and/or information associated with a user device attachment point. For example, network data element 725 may include an identifier for a network device (e.g., of network 150) connected to user device 110, an identifier for a network device connected to provider device 120, etc.

User device type element 730 may include information associated with types (e.g., a personal computer, a cell phone, a STB, a laptop computer, etc.) of user devices 110 connected to network 150. User device speed element 735 may include information associated with speeds (e.g., in gigabits per second) of user devices 110 connected to network 150. Zip code element 740 may include zip code information (e.g., postal zip codes) of user devices 110 connected to network 150.

Provider load element 745 may include information associated with a load (e.g., an amount of bandwidth currently in use between each device in network 100) capable of being handled by provider device 120 for user device 110. Location/geocode element 750 may include geographical location information (e.g., city, county, state, etc.) of user devices 110 connected to network 150.

Although FIG. 7 shows exemplary information that may be provided in datagram 700, in other implementations, datagram 700 may contain less, different, differently arranged, or additional information than depicted in FIG. 7.

Figure 8:
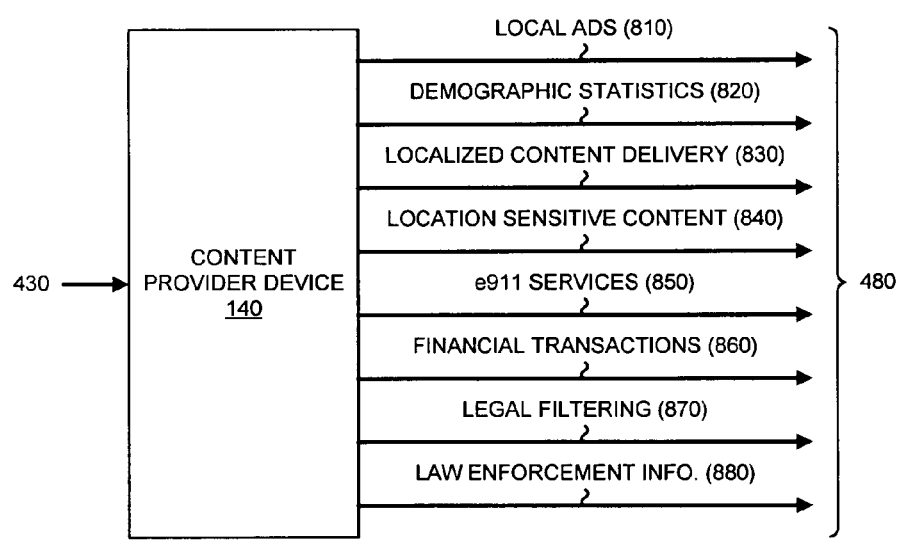
FIG. 8 illustrates a diagram of exemplary content that may be generated by the content provider device depicted in FIG. 1.

FIG. 8 illustrates a diagram of exemplary content 800 that may be generated by content provider device 140. Content provider device 140 may include the features described above in connection with, for example, FIGS. 1 and 4.

As further shown in FIG. 8, if content provider device 140 receives user device information 430 (e.g., from provider device 120), content provider device 140 may generate custom content 480. Custom content 480 may include local advertisements (ads) 810, demographic statistics 820, localized content delivery 830, location sensitive content 840, e911 services information 850, financial transactions information 860, legal filtering information 870, and/or law enforcement information 880.

Local ads 810 may include advertisements specific to a geographic location associated with user device 110 (e.g., as determined from user device information 430). Local ads 810 may be provided at a neighborhood level (e.g., ads for neighborhood services) or a customer premises level. For example, local ads 810 may include information associated with homeowners association content, local firehouses, local police departments, local elections, etc. Local ads 810 may also include information associated a bandwidth (e.g., a high-bandwidth, a low-bandwidth, etc.) provided by provider device 120 (or content provider device 140), and congestion information associated with provider device 120 (or content provider device 140).

Demographic statistics 820 may include statistical information determined based on user device information 430. For example, demographics statistics 820 may include a number of web transactions (e.g., a number of webpage hits, a number of content hits, a number of sales, a number of click-through events, types of connections, etc.) per neighborhood, per town, etc. Demographic statistics 820 may be used (e.g., by other third parties) for distribution and warehousing of products, for brick-and-mortar expansion decisions, etc.

Localized content delivery 830 may include content whose delivery may be redirected to a specific locale's content (e.g., a locale determined based on user device information 430). For example, if user device 110 is located in Atlanta, Ga. and requests network news content (e.g., from CNN), content provider device 140 may redirect the request to a local news service affiliated with CNN (e.g., to "atlanta.cnn.com"). In another example, if user device 110 is located in Arlington, Va. and requests the weather channel, content provider device 140 may redirect the request to a local weather affiliated with the weather channel (e.g., to "arlington.weather.com"). This may permit user device 110 to view weather-related warnings that are local to user device 110.

Location sensitive content 840 may include content specific to a geographic location associated with user device 110 (e.g., as determined from user device information 430). For example, location sensitive content may include movie, weather, traffic, business, etc. information specific to the geographic location associated with user device 110.

e911 services information 850 may include information (e.g., as determined from user device information 430) that enables user device 110 to receive e911 services.

Financial transactions information 860 may include information (e.g., as determined from user device information 430) that enables user device 110 to restrict financial transactions (e.g., credit cards, account inquiries, or other online transactions) to a specific geographic location associated with user device 110. When traveling, new geographic locations of user device 110 may be predetermined from a "home" location associated with user device 110. Financial transactions information 860 may reduce credit card theft by offering another layer of embedded authentication that may be difficult to spoof. For example, banks could use financial transactions information 860 for fraud detection.

Legal filtering information 870 may include information (e.g., as determined from user device information 430) that enables user device 110 to satisfy national or state legal requirements if the location of user device 110 is ascertained by content provider device 140 (or by network devices of network 150) to prohibit certain content. For example, if content from a national content provider is illegal in a particular state, legal filtering information 870 may prevent the national content provider from providing the content to the particular state.

Law enforcement information 880 may include information (e.g., as determined from user device information 430) that enables law enforcement to quickly determine a location of user device 110.

Although FIG. 8 shows exemplary content 800 that may be generated by content provider device 140, in other implementations, content provider device 140 may generate less, different, differently arranged, or additional content than depicted in FIG. 8.

FIGS. 9-13 depict flow charts of an exemplary process 900 for providing user device information to a third party content provider according to implementations described herein. In one implementation, process 900 may be performed by provider device 120. In other implementations, some or all of process 900 may be performed by another device or group of devices (e.g., communicating with provider device 120), such as database 130.

Figure 9:
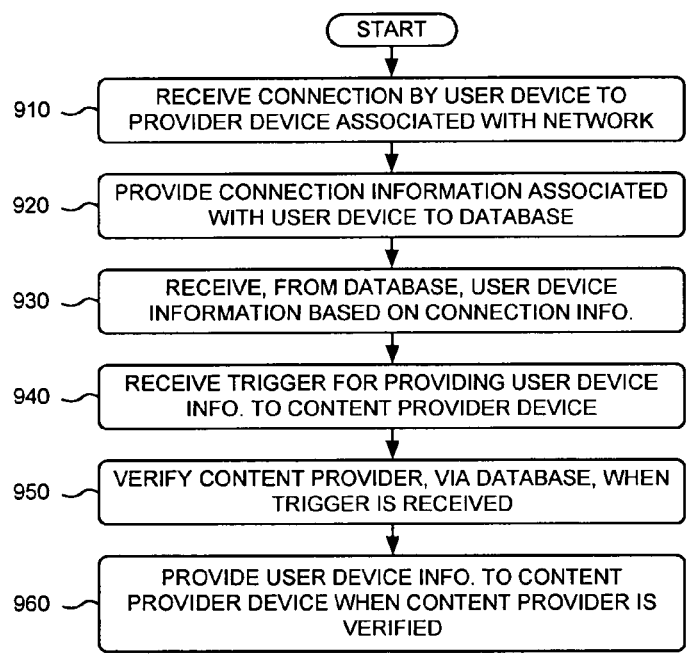
FIGS. 9-13 depict flow charts of an exemplary process for providing user device information to a third party content provider according to implementations described herein.

As illustrated in FIG. 9, process 900 may begin with receiving a connection by a user device to a provider device associated with a network (block 910), and providing connection information associated with the user device to a database (block 920). For example, in implementations described above in connection with FIG. 4, user device 110 may connect to provider device 120, as shown by reference number 410. Provider device 120 may receive connection 410, and may provide connection information 420 to database 130. Connection information 420 may include information associated with user device's 110 connection 410 with provider device 120.

As further shown in FIG. 9, user device information may be received, from the database, based on the connection information (block 930), and a trigger for providing the user device information to a content provider device may be received (block 940). For example, in implementations described above in connection with FIG. 4, user device 110 may provide trigger 440 to provider device 120 and/or another trigger 450 may be provided to provider device 120 (e.g., by content provider device 140 or other sources). Triggers 440/450 may be received by provider device 120, and may direct provider device 120 (e.g., via a postmark protocol associated with network 100) to provide user device information 430 to third parties, such as a third party content provider associated with content provider device 140.

Returning to FIG. 9, the content provider may be verified, via the database, when the trigger is received (block 950), and the user device information may be provided to the content provider device when the content provider is verified (block 960). For example, in implementations described above in connection with FIG. 4, if triggers 440 or 450 are received by provider device 120, user device information 430 may be conveyed, by provider device 120, to authorized content providers (e.g., content provider device 140). Prior to providing user device information 430 to content provider device 140, provider device 120 may verify the content provider associated with content provider device 140, as indicated by reference number 460. For example, provider device 120 may look up in database 130 to determine whether the content provider is a subscriber to user device information 430 (e.g., a location service). If the content provider is verified, as indicated by reference number 470, provider device 120 may provide user device information 430 to content provider device 140.

Figure 10:
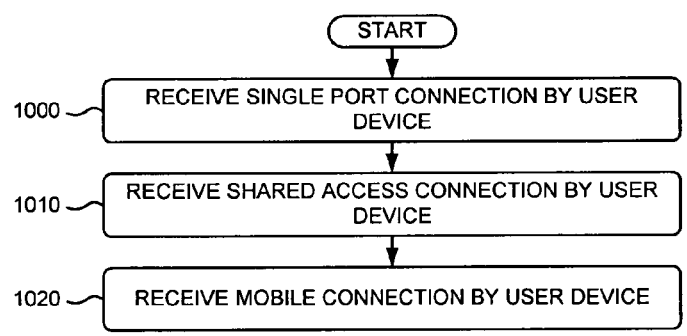

Process block 910 may include the process blocks depicted in FIG. 10. As shown in FIG. 10, process block 910 may include one or more of receiving a single port connection by the user device (block 1000), receiving a shared access connection by the user device (block 1010), and receiving a mobile connection by the user device (block 1020). For example, in implementations described above in connection with FIG. 4, connection 410 between user device 110 and provider device 120 may include a dedicated single logical or physical port connection per each customer (e.g., each user device 110), a shared access connection (e.g., a broadcast domain for a set of customers), a mobile or Wi-Fi connection, etc. Each of these connection types may have a different level of accuracy for a specific location, but other mechanisms (e.g., triangulation mechanisms, heartbeat/NTP/RTT mechanisms, etc.) for increasing accuracy for shared and mobile customers may also be implemented.

Figure 11:
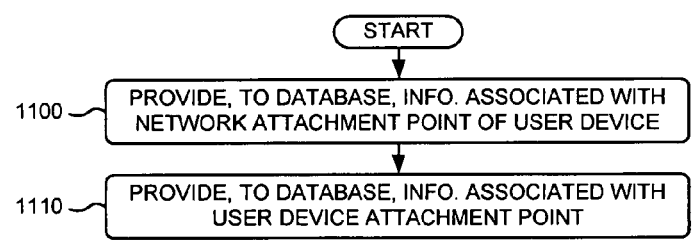

Process block 920 may include the process blocks depicted in FIG. 11. As shown in FIG. 11, process block 920 may include providing, to the database, information associated with a network attachment point of the user device (block 1100), and providing, to the database, information associated with a user device attachment point (block 1110). For example, in implementations described above in connection with FIG. 4, connection information 420 may include information associated with user device's 110 connection 410 with provider device 120. In one example, connection information 420 may include network attachment point information or metadata (e.g., information about network devices of network 150 used to connect user device 110 to provider device 120) that may be initialized on deployment of provider device 120, user device 110 attachment point information or metadata that may be initialized on deployment of a service (e.g., a new service, a changed service, etc.) provided by provider device 120, etc.

Figure 12:
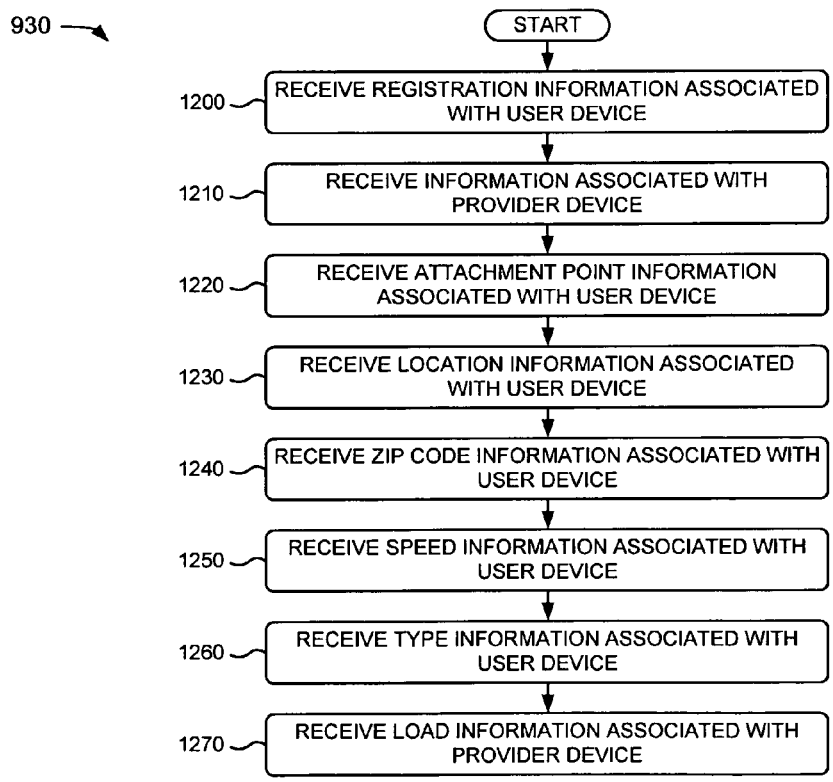

Process block 930 may include the process blocks depicted in FIG. 12. As shown in FIG. 12, process block 930 may include receiving one or more of registration information associated with the user device (block 1200), information associated with the provider device (block 1210), attachment point information associated with the user device (block 1220), location information associated with the user device (block 1230), zip code information associated with the user device (block 1240), speed information associated with the user device (block 1250), type information associated with the user device (block 1260), and load information associated with the provider device (block 1270).

For example, in implementations described above in connection with FIG. 4, user device information 430 may include information (e.g., metadata) about user device 110, a user of user device 110, a connection point of user device 110 (e.g., to network 150), etc. In one example, user device information 430 may include attachment point information (e.g., connection point of user device 110 to network 150); a geographical location of user device 110; a zip code associated with user device 110; a speed (e.g., in gigabits per second) of user device 110; a type (e.g., a brand, a manufacturer, etc.) of user device 110; a timestamp associated with user device 110 (e.g., when user device 110 connects to provider device 120); congestion information associated with connection 410; a load (e.g., a bandwidth) associated with provider device 120; registration information (e.g., a user name, a user address, a user telephone number, etc.) associated with a user; other database 130 information (e.g., information about third party content providers, such as a content provider associated with content provider device 140); other measurements and/or characteristics associated with network 150; etc.

Figure 13:
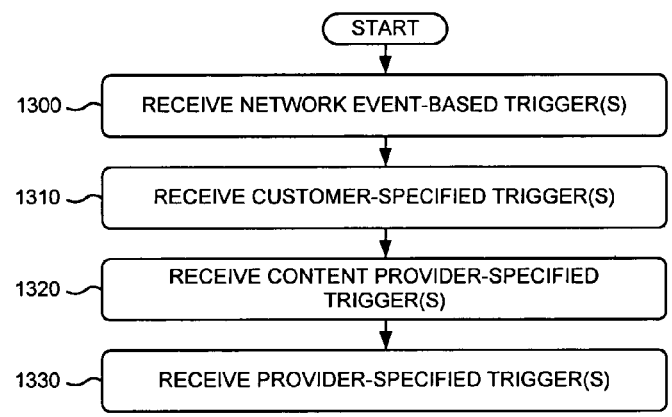

Process block 940 may include the process blocks depicted in FIG. 13. As shown in FIG. 13, process block 940 may include receiving network event-based trigger(s) (block 1300), receiving customer-specified trigger(s) (block 1310), receiving content provider-specified trigger(s) (block 1320), and/or receiving provider-specified trigger(s) (block 1330). For example, in implementations described above in connection with FIG. 4, triggers 440/450 may include network event-based triggers (e.g., a trigger for every packet, a trigger for every Transmission Control Protocol (TCP) open, a trigger for every TCP close, a port-based trigger, etc.), customer-specified triggers (e.g., a customer may want bandwidth specified to remote devices, such as content provider device 140), destination-specified triggers (e.g., content providers may wish to provide real-time localized content to user device 110), provider-specified triggers (e.g., provider device 120 may provide enhanced 911 (or "e911") emergency services), etc.

Figure 14:
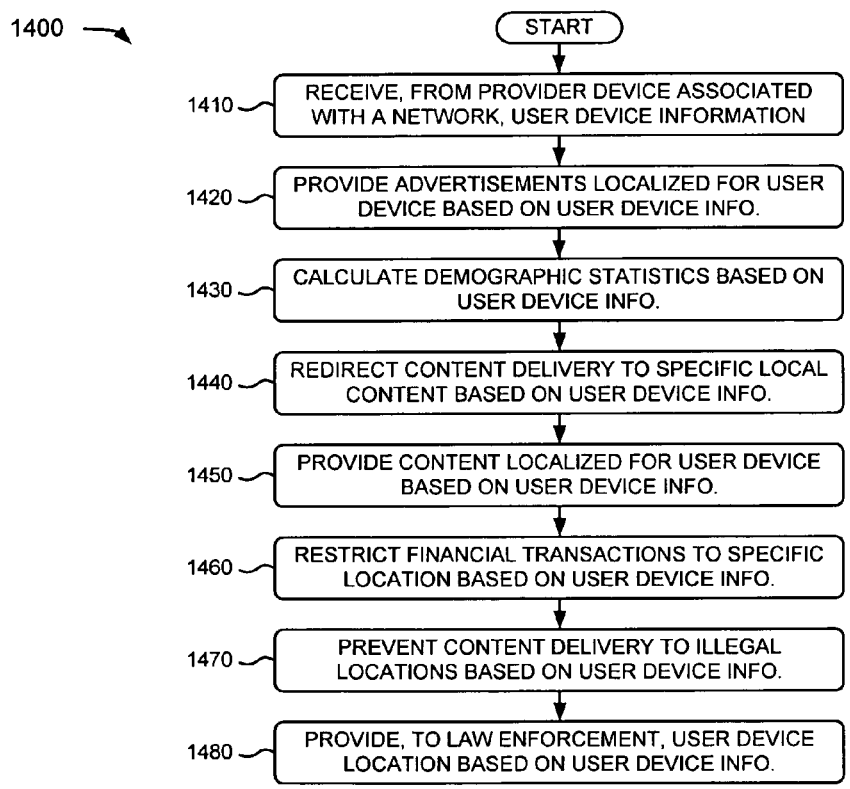
FIG. 14 illustrates a flow chart of an exemplary process for generating custom content based on user device information according to implementations described herein.

FIG. 14 depicts a flow chart of an exemplary process 1400 for generating custom content based on user device information according to implementations described herein. In one implementation, process 1400 may be performed by content provider device 140. In other implementations, some or all of process 1400 may be performed by another device or group of devices (e.g., communicating with content provider device 140).

As illustrated in FIG. 14, process 1400 may begin with receiving, from a provider device associated with a network, user device information (block 1410), and providing advertisements localized for a user device based on the user device information (block 1420). For example, in implementations described above in connection with FIGS. 4 and 8, if content provider device 140 receives user device information 430, content provider device 140 may provide custom content 480 to user device 110. Custom content 480 may include a variety of information customized based on user device information 430 (e.g., based on a location associated with user device 110). Custom content 480 may include local advertisements (ads) 810 that may include advertisements specific to a geographic location associated with user device 110 (e.g., as determined from user device information 430). Local ads 810 may be provided at a neighborhood level (e.g., ads for neighborhood services) or a customer premises level.

As further shown in FIG. 14, demographic statistics may be calculated based on the user device information (block 1430), content delivery may be redirected to specific local content based on the user device information (block 1440), and content that is localized for the user device, based on the user device information, may be provided (block 1450). For example, in implementations described above in connection with FIG. 8, custom content 480 may include demographic statistics 820, localized content delivery 830, and location sensitive content 840. Demographic statistics 820 may include statistical information determined based on user device information 430. In one example, demographics statistics 820 may include a number of web transactions (e.g., a number of webpage hits, a number of content hits, a number of sales, a number of click-through events, types of connections, etc.) per neighborhood, per town, etc. Localized content delivery 830 may include content whose delivery may be redirected to a specific locale's content (e.g., a locale determined based on user device information 430). Location sensitive content 840 may include content specific to a geographic location associated with user device 110 (e.g., as determined from user device information 430). In one example, location sensitive content may include movie, weather, traffic, business, etc. information specific to the geographic location associated with user device 110.

Returning to FIG. 14, financial transactions may be restricted to a specific location based on the user device information (block 1460), content delivery to illegal locations may be prevented based on the user device information (block 1470), and a user device location may be provided to law enforcement based on the user device information (block 1480). For example, in implementations described above in connection with FIG. 8, custom content 480 may include e911 services information 850, financial transactions information 860, legal filtering information 870, and law enforcement information 880. e911 services information 850 may include information (e.g., as determined from user device information 430) that enables user device 110 to receive e911 services. Financial transactions information 860 may include information (e.g., as determined from user device information 430) that enables user device 110 to restrict financial transactions (e.g., credit cards, account inquiries, or other online transactions) to a specific geographic location associated with user device 110. Legal filtering information 870 may include information (e.g., as determined from user device information 430) that enables user device 110 to satisfy national or state legal requirements if the location of user device 110 is ascertained by content provider device 140 (or by network devices of network 150) to prohibit certain content. Law enforcement information 880 may include information (e.g., as determined from user device information 430) that enables law enforcement to quickly determine a location of user device 110.

Implementations described herein may provide systems and/or methods that retrieve information (e.g., customer information, device configuration information, location information, etc.) about a user device attached to a provider device via a network. The systems and/or methods may provide specific or general information about the customer and/or the user device based on the retrieved information. Information may be retrieved and/or provided via a postmark protocol. The postmark protocol may permit network devices associated with the network to provide information (e.g., metadata) regarding their locations, which may permit end-to-end geo-location path discovery. Alternatively, the network devices may hide their geographic topologies from external entities (e.g., third party content providers not associated with the network). The postmark protocol may be used to restrict or allow network flows, identify locations of user devices or network devices, allow localized differentiation for transactions, etc.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 9-14, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
 establishing, by a computing device, a connection between a user device and the computing device;
 obtaining, by the computing device, information associated with the connection based on establishing the connection,
  the information associated with the connection including:
   information identifying the user device, and
   geographical location information associated with information identifying a geographical location of the user device;
 searching, by the computing device, a memory using the information associated with the connection;
 obtaining, from the memory and by the computing device, user device information based on searching the memory using the information associated with the connection,
  the user device information including:
   the information identifying the geographical location of the user device,
   information identifying a type of the user device, and
   at least one of:
    information identifying a speed of data transmission associated with the user device, or
    information identifying an amount of bandwidth provisioned for a user of the user device and a portion of the amount of bandwidth that is being used by the user;
 receiving, by the computing device, a trigger instructing the computing device to provide the user device information to a content provider device,
  receiving the trigger including:
   receiving a content provider-specified trigger from the content provider device; and
 providing, by the computing device, the user device information to the content provider device based on receiving the trigger,
  custom content, generated by the content provider device based on the user device information, being provided to the user device based on the user device information being provided to the content provider device,
   the custom content including particular information that enables the user device to restrict a financial transaction to a specific geographical location,
    the financial transaction being enabled when the geographical location of the user corresponds to the specific geographical location.

2. The method of claim 1, where establishing the connection comprises one or more of:
 establishing a single port connection between the user device and the computing device,
 establishing a shared access connection between the user device and the computing device, or
 establishing a mobile connection between the user device and the computing device.

3. The method of claim 1, where searching the memory using the information associated with the connection comprises one or more of:
  searching the memory further using information associated with a network attachment point of the user device,
    where the information associated with the network attachment point includes information associated with one or more devices used to connect the user device to the computing device, or
  searching the memory further using information associated with a user device attachment point,
    where the information associated with the connection is received via a network, and
    where the information associated with the user device attachment point includes information identifying a connection point of the user device to the network.

4. The method of claim 1, where obtaining the user device information further includes one or more of:
  obtaining registration information associated with the user device,
    where the registration information includes information identifying a user of the user device,
  obtaining information identifying an attachment point associated with the user device,
    where the information identifying the attachment point includes information identifying a connection point of the user device to a network associated with the computing device, or
  obtaining information identifying a zip code associated with the user device.

5. The method of claim 1, where receiving the trigger further comprises one or more of:
  receiving a trigger that is based on one or more events in the network,
  receiving a customer-specified trigger from the user device, or
  receiving a provider-specified trigger from a provider device.

6. The method of claim 1, further comprising:
  verifying a content provider associated with the content provider device after receiving the trigger,
  where verifying the content provider includes:
    determining whether the content provider is authorized to receive the user device information; and
    providing the user device information to the content provider device when the content provider is verified,
      where the user device information is provided to the content provider device when the content provider is authorized to receive the user device information.

7. The method of claim 1, where the particular information further enables the user device to restrict the financial transaction to at least one additional geographical location.

8. The method of claim 7, where the custom content further comprises one or more of:
  content localized for the user device based on the information identifying the geographical location of the user device, or
  content redirected to a specific local content provider based on the information identifying the geographical location of the user device.

9. The method of claim 1, where the computing device comprises a provider device, and
  where the memory stores:
    information identifying a type of each user device of a plurality of user devices that are associated with a plurality of users,
    information identifying an amount of bandwidth provisioned for each user of the plurality of users, and
    information identifying a speed of data transmission associated with each user device of the plurality of user devices.

10. The method of claim 1, where the user device comprises one or more of:
  a radiotelephone,
  a personal communications system (PCS) terminal,
  a set-top box (STB),
  a personal digital assistant (PDA),
  a laptop computer, or
  a personal computer.

11. A method comprising:
  providing, by a computing device, a content provider-specified trigger to another device;
  receiving, by the computing device and from the other device, user device information associated with a user device connected to the other device,
    the user device being received based on the content provider-specified trigger,
    the user device information including:
      information identifying a geographical location of the user device,
      information identifying a type of the user device, and
      at least one of:
        information identifying a load associated with the user device,
          the information identifying the load including information identifying an amount of bandwidth provisioned for a user of the user device and a portion of the amount of bandwidth that is being used by the user, or
        information identifying a speed of data transmission associated with the user devices;
  generating, by the computing device and based on the user device information, custom content for the user device based on receiving the user device information,
    the custom content including:
      information that enables the user device to restrict one or more financial transactions to a specific geographical location,
        the one or more financial transactions being enabled when the specific geographical location corresponds to the geographical location of the user device; and
  providing, by the computing device, the custom content to the user device.

12. The method of claim 11, where the custom content further includes one or more of:
  content customized for the user device based on the information identifying the geographical location of the user device, or
  content redirected to a specific local content provider based on the information identifying the geographical location of the user device.

13. The method of claim 11, further comprising one or more of:
  calculating demographic statistics based on the user device information,
    where the custom content further includes information associated with the calculated demographic statistics, or
  providing, to a device associated with law enforcement or emergency services entities, the geographical location of the user device based on the user device information.

14. The method of claim 11, where the computing device comprises a content provider device,
the method further comprising:
preventing delivery of particular content to the user device based on the information identifying the geographical location of the user device.

15. A device, comprising:
a memory to store a plurality of instructions; and
a processor to execute one or more of the plurality of instructions in the memory to:
establish a connection between a user device and the device,
obtain information associated with the connection based on establishing the connection,
the information associated with the connection including:
information identifying the user device, and
geographical location information associated with information identifying a geographical location of the user device,
search a particular memory, associated with the device, using the information associated with the connection,
obtain, from the particular memory associated with the device, user device information based on searching the particular memory using the information associated with the connection,
the user device information including:
the information identifying the geographical location of the user device, and
at least one of:
information identifying a load associated with the user device,
the information identifying the load including information identifying an amount of bandwidth provisioned for a user of the user device, or
information identifying a type of the user device,
receive a trigger instructing the device to provide the user device information to a content provider device,
when receiving the trigger, the processor is to:
receive a content provider-specified trigger from the content provider device,
verify a content provider associated with the content provider device based on receiving the trigger, and
provide the user device information to the content provider device, based on verifying the content provider, to enable the content provider device to generate content for the user device,
the content being customized based on the user device information,
the content including information that enables the user device to restrict a financial transaction to a specific geographical location,
the financial transaction being enabled when the geographical location of the user corresponds to the specific geographical location.

16. The device of claim 15, where the device comprises a provider device, and
where, when searching the particular memory using the information associated with the connection, the processor is to execute a query, on the particular memory associated with the device, based on the information associated with the connection, and
where the user device information is obtained as a result of executing the query on the particular memory associated with the device.

17. The device of claim 15, where the connection further includes one or more of:
a single port connection,
a shared access connection, or
a mobile connection.

18. The device of claim 15, where the information associated with the connection further includes one or more of:
information associated with a network attachment point of the user device, or
information associated with a user device attachment point.

19. The device of claim 15, where the user device information further includes one or more of:
registration information associated with the user device, where the registration information includes information identifying the user of the user device,
information identifying an attachment point associated with the user device,
information identifying a zip code associated with the user device, or
information identifying a speed of data transmission associated with the user device.

20. The device of claim 15, where, when receiving the trigger, the processor is further to receive one or more of:
a trigger that is based on an event in a network,
a customer-specified trigger from the user device, or
a provider-specified trigger that is based on one or more services provided by the device.

21. The device of claim 15, where the content further comprises one or more of:
content localized for the user device based on the user device information, or
content redirected to a specific local content provider based on the user device information.

22. The device of claim 15, where the type of the user device comprises one or more of:
a radiotelephone,
a personal communications system (PCS) terminal,
a set-top box (STB),
a personal digital assistant (PDA),
a laptop computer, or
a personal computer.

23. The method of claim 11, where the information identifying the load associated with the user device further includes information identifying a remainder of the amount of bandwidth provisioned for the user of the user device, and
where the user device information further includes:
information identifying an attachment point associated with the user device.

24. The method of claim 11, where providing the custom content includes:
providing e911 services information associated with the geographical location of the user device.

25. The device of claim 15, where the particular memory, associated with the device, stores:
information identifying a type of each user device of a plurality of user devices that are associated with a plurality of users,
information identifying an amount of bandwidth provisioned for each user of the plurality of users,
information identifying a speed of data transmission associated with each user device of the plurality of user devices, and
information identifying a location of each user device of the plurality of user devices.

* * * * *